July 8, 1947.     L. E. ANSORGE     2,423,632
COUPLING
Filed Oct. 21, 1943

INVENTOR.
LOUIS E. ANSORGE
BY
Arthur R. Woolfolk
ATTORNEY.

Patented July 8, 1947

2,423,632

UNITED STATES PATENT OFFICE 2,423,632

COUPLING

Louis E. Ansorge, Manitowoc, Wis., assignor to Eastman Mfg. Company, Manitowoc, Wis.

Application October 21, 1943, Serial No. 507,063

4 Claims. (Cl. 285—86)

This invention relates to couplings and is particularly directed to renewable couplings.

In renewable couplings it is the usual practice to provide a body portion having a tubular insert adapted to enter the hose and a compression sleeve surrounding the hose and compressed by means of a nut screwed on the body portion to thus cause the hose to be tightly gripped between the insert and the compression sleeve. When it is desired to renew the hose, the old compression sleeve is replaced by a new compression sleeve, but the body portion and nut are used again.

It is the usual practice to screw the tubular insert into the body portion and thereafter swage the insert by means of a mandrel so as to provide an excellent seal particularly for high pressure work.

In the old practice, it was found that when the clamping nut was tightened the friction between the nut and the compression sleeve frequently caused the sleeve to turn with the nut either cutting and damaging the hose or else turning the hose and the insert which was tightly gripped by the hose. Any turning of the insert broke the seal between the insert and the body portion. When it is considered that the chance of breaking the seal between the insert and the body portion occurs when the nut is screwed in place the first time, when the nut is unscrewed for renewal purposes and when the nut is screwed into place after a new hose has been substituted for the old hose, it will be seen that the insert is subjected to many twisting efforts for even one renewal. These results are enhanced by the fact that hoses as supplied by the trade have wide tolerances or material variations and consequently a clamping nut tightened to a given degree with one hose may have a very much greater tendency to twist the insert and thus break the seal when tightened to the same degree for another hose.

This invention is designed to overcome the above noted defects and objects of this invention are to provide a coupling construction in which the tubular insert is screwed into the body portion and subsequently swaged to insure a perfect seal with the body portion and in which means are provided for holding the compression sleeve against turning during tightening or removal of the clamping nut so that there is no tendency to break the seal between the insert and the body portion and so that there is no tendency to cut the hose.

Embodiments of the invention are shown in the accompanying drawings, in which.

Figure 1:
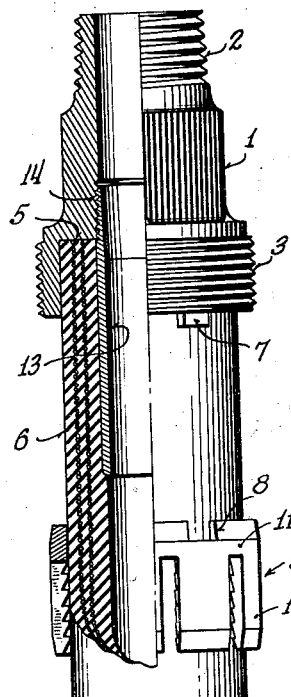
Figure 1 is a view of one form of the coupling, such view showing parts broken away and parts in section and showing the hose in place and the compression sleeve and clamping nut separated from the body portion.
Figure 2:
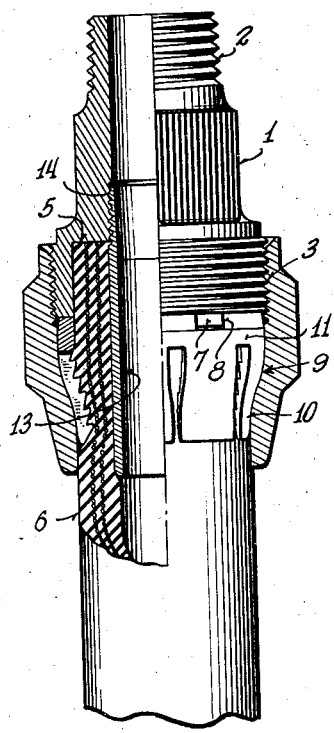
Figure 2 is a view showing the coupling in its final assembled condition, such view being partly broken away and in section.
Figure 3:
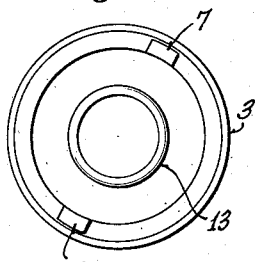
Figure 3 is an end view of the body portion.
Figure 4:
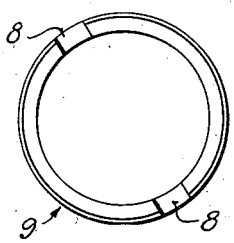
Figure 4 is an end view of the compression sleeve.
Figure 5:
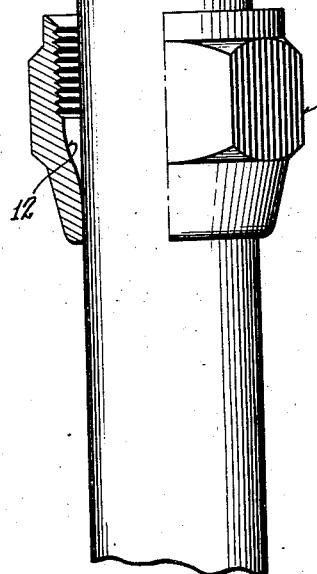
Figure 5 is a view of the tubular insert before it is assembled in the body portion.

Referring to Figures 1 to 5, it will be seen that the coupling comprises a body portion 1 which may be provided with a threaded portion 2. This threaded portion may be either a male or female portion, a male portion having been shown. The outer end of the coupling is provided with an enlarged, externally threaded portion 3 adapted to receive an internally threaded clamping nut 4. The body portion is provided with an abrupt shoulder 5 against which the reinforced high pressure hose 6 is adapted to abut. The body portion is also provided with a plurality of outwardly projecting lugs 7 which are adapted to fit within correspondingly recessed portions 8 of a compression sleeve indicated generally at 9. This compression sleeve is slotted and provided with a plurality of fingers 10 and with a continuous annular portion 11. The inner surface of the fingers 10 are barbed so as to grip the hose, as shown in Figure 2. The barbed portion of the fingers may be provided by means of a thread cut internally of the fingers 10 and having abrupt shoulders as indicated.

The clamping nut is provided with a tapered inner portion 12 which is adapted to engage the outer surface of the deformable compression sleeve 9 and to force the fingers 10 inwardly into intimate binding engagement with the hose, as shown in Figure 2.

It is to be noted particularly that in these high pressure hose couplings it is necessary to provide a tubular insert 13 which is threaded at its end as indicated at 14 and is screwed tightly into the body portion. This screw fit is not sufficient to withstand the high pressure to which this type of coupling is subjected and the threaded end of the insert is therefore internally swaged by means of a mandrel so as to secure a tight and perfect seal with the body portion.

It is to be noted that the compression sleeve 9 has interlocking engagement with the body portion due to the lugs 7 and recesses 8 respectively formed on the body portion and in the compression sleeve. This prevents turning of the compression sleeve when the nut 4 is tightened or when it is removed. It has been found that the slightest rotary motion of the tubular insert 13 will break the seal and will allow leaking between the insert and the body portion. However, in view of the fact that the compression sleeve 9 is locked against rotation with respect to the body portion, it is apparent that no twisting effect can be transmitted from the nut through the compression sleeve and hose to the tubular insert 13, and consequently no matter how many times this coupling is renewed or no matter how tightly the nut is clamped in place, the seal is not broken between the insert and the body portion. In addition to this, there is no cutting or damage to the hose which would occur had the compression sleeve been allowed to turn.

Figure 6:
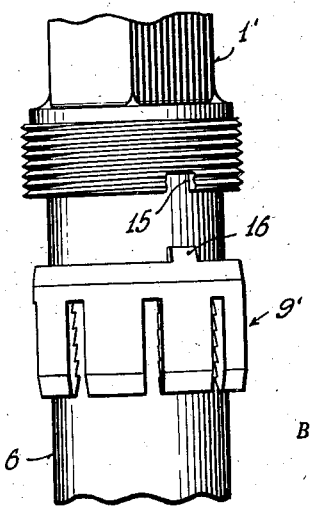
Figure 6 is a fragmentary view showing a further form of the invention.

The invention may take other forms. For example as shown in Figure 6 the body portion 1' is provided with notches 15 which receive lugs 16 carried by the compression sleeve 9', the parts being reversed from that shown in Figure 1.

It is to be understood that when the coupling is to be renewed, the clamping nut and the body portion are retained but a new compression sleeve is employed.

It will be seen that a high pressure renewable type of coupling has been provided by this invention which prevents damage to the hose when the clamping nut is screwed into position to deform and compress the compression sleeve. Particularly it is to be noted that this invention provides means whereby a perfect and perfectly maintained seal is provided between the tubular insert and the body portion and this seal is not broken no matter how tightly the clamping nut may be screwed into place and no matter how many times the coupling may be renewed.

It will be seen that a novel means has been provided whereby a screw threaded and swaged seal is provided between the tubular insert and body portion and whereby no turning tendency whatsoever is imparted to the tubular insert.

Although this invention has been described in considerable detail, it is to be understood that such description is intended as illustrative rather than limiting, as the invention may be variously embodied and is to be interpreted as claimed.

I claim:

1. A renewable hose coupling comprising a body portion, said body portion having a cylindrical unbroken portion provided with unbroken external threads extending around said cylindrical portion a plurality of times in a continuous manner, a tubular insert screwed into said body portion and swaged in place, a hose surrounding said tubular insert, a compression sleeve surrounding said hose and having interlocking engagement with the body portion at a point spaced from said continuous threads to prevent turning of said compression sleeve, and a clamping nut screwed only on to said body portion and having an internal tapered portion for compressing said compression sleeve to cause the hose to be tightly gripped between the compression sleeve and the tubular insert.

2. A renewable hose coupling comprising a body portion, said body portion having a cylindrical unbroken portion provided with unbroken external threads extending around said cylindrical portion a plurality of times in a continuous manner, a tubular member projecting from said body portion, a hose surrounding said tubular member, a compression sleeve surrounding said hose and having interlocking engagement with said body portion at a point spaced from said continuous threads to prevent turning of said compression sleeve, and a clamping nut screwed only on to said body portion and having an internal tapered portion for compressing said compression sleeve to cause the hose to be tightly gripped between said sleeve and said tubular member.

3. A high pressure renewable coupling comprising a body portion, said body portion having a cylindrical unbroken portion provided with unbroken external threads extending around said cylindrical portion a plurality of times in a continuous manner, a tubular insert screwed into said body portion and internally swaged to insure a good seal with said body portion, a reenforced, high pressure hose surrounding said insert, an internally barbed, deformable compression sleeve surrounding said hose, said compression sleeve having a continuous annular rear portion interlocked with said body portion at a point spaced from said continuous threads to prevent turning of said compression sleeve and being slotted to provide a plurality of forwardly projecting fingers, and a clamping nut screwed only on to said body portion and having a tapered internal portion for compressing said compression sleeve to cause said hose to be tightly gripped between said compression sleeve and said tubular insert.

4. A high pressure renewable coupling comprising a body portion, said body portion having a cylindrical unbroken portion provided with unbroken external threads extending around said cylindrical portion a plurality of times in a continuous manner, a tubular insert extending into said body portion and internally swaged to insure a good seal with said body portion, a reenforced, high pressure hose surrounding said insert, an internally barbed, deformable compression sleeve surrounding said hose, said compression sleeve having a continuous annular rear portion interlocked with said body portion at a point spaced from said continuous threads to prevent turning of said compression sleeve and being slotted to provide a plurality of forwardly projecting fingers, and a clamping nut screwed only on to said body portion and having a tapered internal portion for compressing said compression sleeve to cause said hose to be tightly gripped between said compression sleeve and said tubular insert.

LOUIS E. ANSORGE.

REFERENCES CITED

The following references are of record in the file of this patent:

UNITED STATES PATENTS

| Number | Name | Date |
|---|---|---|
| 1,428,949 | Eastman | Sept. 12, 1922 |
| 1,637,095 | Walters | July 26, 1927 |
| 2,031,825 | Eastman | Feb. 25, 1936 |

FOREIGN PATENTS

| Number | Country | Date |
|---|---|---|
| 471,616 | Great Britain | Sept. 8, 1937 |